United States Patent [19]

Mori

[11] Patent Number: 4,717,227
[45] Date of Patent: * Jan. 5, 1988

[54] SOLAR RAY COLLECTING DEVICE INCLUDING PROTECTIVE COVER AND FILTER

[76] Inventor: Kei Mori, 3-16-3-501, Kaminoge, Setagaya-ku, Tokyo, Japan

[*] Notice: The portion of the term of this patent subsequent to Sep. 17, 2002 has been disclaimed.

[21] Appl. No.: 657,105

[22] Filed: Oct. 2, 1984

[30] Foreign Application Priority Data

Oct. 4, 1983 [JP] Japan ................................ 58-186113

[51] Int. Cl.$^4$ ........................... G02B 6/00; B64G 1/44; F24J 2/08
[52] U.S. Cl. ................. 350/96.10; 350/96.18; 350/96.24; 350/252; 350/253; 244/173; 126/418; 126/419; 126/440; 126/446
[58] Field of Search ................ 244/173; 136/243, 244, 136/246, 248, 251, 257, 259, 292

[56] References Cited

U.S. PATENT DOCUMENTS

| | | | |
|---|---|---|---|
| 4,097,309 | 6/1978 | Horne | 136/257 X |
| 4,292,955 | 10/1981 | Smith | 126/417 |
| 4,340,034 | 7/1982 | Hopper | 126/438 |
| 4,541,415 | 9/1985 | Mori | 126/440 |
| 4,653,472 | 3/1987 | Mori | 126/440 |
| 4,659,176 | 4/1987 | Mori | 350/96.18 |
| 4,661,649 | 4/1987 | Reisfeld et al. | 350/96.10 X |

Primary Examiner—William L. Sikes
Assistant Examiner—Brian M. Healy
Attorney, Agent, or Firm—Jordan and Hamburg

[57] ABSTRACT

A solar ray collecting device for use in space includes a heat-conductive supporting base plate provided with a large number of adjacent hexagonal recess portions, a large number of optical systems installed on each of the recess portions, a large number of heat-conductive protective bars set up on an upper vertex of a side wall forming the recess portion, and a protective cover for covering a light-receiving surface side of the supporting base plate and having the function of a filter capable of letting visible rays pass through. A pointed end portion of the protective bar is brought into heat-conductive contact with the protective cover.

7 Claims, 5 Drawing Figures

SOLAR RAY COLLECTING DEVICE INCLUDING PROTECTIVE COVER AND FILTER

BACKGROUND OF THE INVENTION

The present invention relates to a solar ray collecting device preferably used in space where plenty of X-rays and ultraviolet rays are present and where there is much heat radiation.

The present applicant has previously proposed various kinds of solar ray collecting devices in which solar rays are focused by a lens or the like and guided into an optical conductor cable, and further those solar rays are transmitted through the optical conductor cable onto an optional desired place for use in illumination or for other purposes.

Among the solar ray collecting devices proposed by the present applicant, there is one in which a large number of lenses, (for example, about 2000 lenses) having a diameter equal to or less than about 4 cm, are employed for focusing solar rays. The light-receiving edge of the optical fiber, having a diameter of about 0.1 mm through 0.2 mm, is precisely positioned at the focal point of each of the respective lenses so as to guide the solar rays, focused by each lens, into the optical fiber. Concerning this solar ray collecting device just described, the focal distance is equal to or less than about 4 cm. Therefore it is possible to manufacture a very thin solar ray collecting device.

On the other hand however, the focal position of the lens has to precisely coincide with the light-receiving edge surface of the optical fiber. In the case of using the device in a desert where the ambient temperature varies to a large extent in space, or in a tropical area, the lens and supporting member thermally expand so that the positional relationship between the focus of the lens and the light-receiving edge surface of the optical fiber varies greatly. In such a case it is also possible that the lens and the optical fiber or the like will be destroyed by the extreme heat generated.

In order to settle such a problem as mentioned above, the present applicant has already proposed a solar ray collecting device which is comprised of a supporting base plate on which a large number of hexagonal recesses are provided and on which a large number of optical systems are arranged on each of the recesses, each of the optical systems is comprised of a hexagonal focusing lens of a dimension that is approximately the same as that of the hexagonal recesses and the head-cut hexagonal pyramid which extends downward from the light-collecting lens as an upper surface of the recess, an optical conductor whose light-receiving surface is provided on the focus of the light-collecting lens, and the upper internal circumferential surface of the side wall, forming the recess, is so formed that it may be able to move freely on the surface of the hexagonal pyramid.

However the above-mentioned solar ray collecting device was created without taking into account the existence of X-rays, γ-rays and ultraviolet rays in space, and furthermore without taking into account the special situation related to the effects of thermal energy in space, i.e. the fact that heat generated by radiation is present. For these reasons, the conventional solar ray collecting device was not satisfactory for using it in space.

SUMMARY OF THE INVENTION

It is therefore an object of the present invention to provide a solar ray collecting device for use in space.

It is also an object of the present invention to provide a solar ray collecting device, of the type in which a large number of lenses having about 4 cm or less in diameter are used, to focus solar rays.

It is another object of the present invention to provide a solar ray collecting device which would effectively absorb the heat expansion of the lens and its supporting member thus preventing them from being destroyed by extreme heat.

Still another object of the present invention is to provide a solar ray collleting device which would enable the focus position of each lens to always coincide with the light-receiving edge surface of the optical fiber.

Such a device is made up of a heat-conductive support base plate, a large number of hexagonal recess portions, a large number of optical systems installed on each of the recess portions, a large number of heat-conductive protection bars which are set up on the upper vertex of a side wall forming the recess portion, and a protection cover for a light-receiving surface side of the supporting base plate having the function of a filter which is capable of leting visible rays pass through, a pointed end portion of the protection bar being brought into heat-conductive contact with the protection cover.

The above and other features and advantages of the present invention will become apparent from the following detailed descrption which goes with the accompanying drawings.

DESCRIPTION OF THE PREFERRED EMBODIMENTS

The present invention relates to a solar ray collecting device preferably used in space where plenty of X-rays and ultraviolet rays are present and where heat caused by radiation is extensive.

The present applicant has previously proposed various kinds of solar ray collecting devices in which solar rays are focused by a lens or the like and guided into an optical conductor cable and further those solar rays are transmitted through the optical conductor cable onto an optional desired place for use in illumination or for other purposes.

Among the solar ray collecting devices proposed by the present applicant, there is a solar ray collecting device in which a large number of lenses, (for example about 2000 lenses) having a diameter equal to or less than about 4 cm, are employed for focusing solar rays, and the light-receiving edge of the optical fiber having a diameter of about 0.1 mm through 0.2 mm is precisely positioned at the focal point of each of the respective lenses so as to guide the solar rays focused by each lens into the optical fiber. Concerning this particular solar ray collecting device, the focal distance is equal to or less than about 4 cm. Therefore, it is possible to make a very thin solar ray collecting device.

On the other hand, however, the focal position of the lens has to coincide precisely with the light-receiving edge surface of the optical fiber. Especially, as in the case of employing the device in a desert where the ambient temperature varies to a large extent in space, or in a tropical area, the lens and supporting member thermally expand so that the positional relation between the focus of the lens and the light-receiving edge surface of the optical fiber varies largely. Furthermore the lens and the optical fiber or the like may be thermally destroyed.

Figure 1:
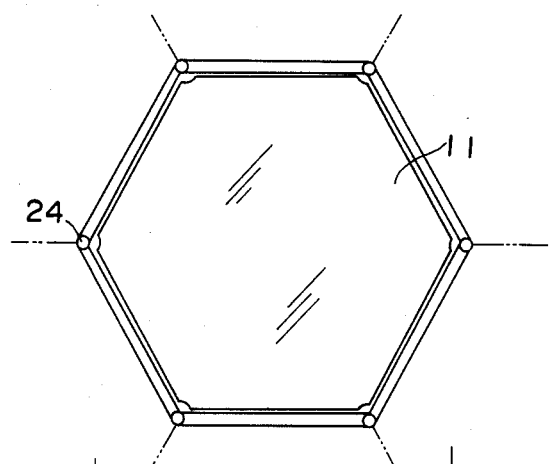
FIG. 1 is a plane view partly enlarged for explaining an embodiment of the solar ray collecting device previously proposed by the present applicant.

In order to settle such problems as mentioned above, the present applicant has already proposed a solar ray collecting device as shown in FIG. 1. (Refer to the Japanese Patent Application, No. JAP 58-99978.)

In FIG. 1, 10 is an optical system and 20 is a supporting member for supporting it. In practice, a large number of optical systems (for instance, about 60 of them) as shown in FIG. 1 are arranged on the supporting member 20.

Each of the respective optical systems 10, basically consists of a hexagonal lens 11 having a diameter of about 4 cm or less, a head-cut hexagonal pyramid 12 on which the lens 11 is mounted, and an optical fiber 13, the light-receiving edge surface of which is precisely positioned at the focus of the lens 11. Solar rays focused by the lens 11 are guided into the optical fiber 13.

A large number of hexagonal recess portions 21 for accommodating the optical systems 10 are formed on the supporting member 20. The upper portion of a side wall 22 forming the recess portion 21 has an inclined surface 23, the inclination of which is equal to that of the pyramidal surface of the hexagonal pyramid 12.

Consequently, when the lens and the supporting member expand thermally the hexagonal pyramid 12 of the optical system 10 moves upward in a direction A shown by an arrow sliding along the inclined surface 23, and when the lens and the supporting member contract from cooling, the pyramid 12 moves downward in a direction B shown by an arrow and sliding along the same inclined surface because the expansion rate of the lens and the hexagonal pyramid is, in general, larger than that of the others. On that occasion, the focal position of the lens 11 scarecely changes and therefore the solar rays are always effectively guided into the optical fiber 13.

Moreover, on that occasion, if the lens expands to a large extent the respective lenses coming into closer contact wtih each other are apt to collide against each other and to be destroyed. In order to avoid such a problem, a protection bar 24 is set up at each vertex of the side wall's 22 upper surface, i.e. at a location where the respective lenses are apt to be destroyed. Furthermore, the vertex of each lens is provided with a spacing area 11a. In such a manner, destruction of the respective lenses due to mutual collision can be prevented.

As is apparent, in general, there exists no indirect solar rays in space. Direct solar rays are focused by the lens 11 and guided into the optical fiber 13. Consequently, if all of the direct solar rays can be put into the optical fiber, there is no need to worry about the overheating of the supporting base plate.

In practice, however it may be impossible to put all of the rays into the optical fiber and therefore in such a case the supporting base plate would be overheated by the rays that are not guided into the optical fiber. Even if such rays, not guided into it, are utilized in some way, it may turn out to be possible to suppress thermal expansion of the optical system to some extent.

Consequently a transparent material which hardens in high ambient temperatures, for example an acrylic material, is employed as a hexagonal pyramid 12 and on its external circumferential surface aluminum is evaporated 14 in order to form a light-reflecting layer there.

Moreover, a solar battery 15 is installed on the bottom surface portion of the hexagonal pyramid 12 and an optical reaction is caused by the use of optical energy so as to circulate an inductive material 16 for storing energy. In such a manner, the solar rays guided into the hexagonal pyramid 12 are effectively reflected off of the aluminum surface 14 and further those rays are guided onto the bottom surface of the hexagonal pyramid. In the area, the light energy is converted to electrical energy, or otherwise it is stored in the inductive material.

On that occasion, if a fluorescent material is mixed with other materials in the transparent acrylic hexagonal pyramid, it may be possible to convert the rays entering the hexagonal pyramid to light energy having a wave length capable of most easily reacting to the solar battery or the inductive material therein. Furthermore, the internal circumferential surface of the hexagonal pyramid can be coated with aluminum for forming a reflecting surface therein. In such a manner, since the light rays entering the hexagonal pyramid are reflected and are discharged outside, the rise in temperature of the entire solar ray collecting device can be controlled to some extent.

However, the above-mentioned solar ray collecting device was made without taking into consideration any countermeasures against the existence of X-rays, γ-rays and ultraviolet rays in space and furthermore without considering the effects of thermal energy i.e. the fact that the heat caused by radiation is extensive. For these reasons, the solar ray collecting device described above was not a satisfactory one, epsecially in the case of using it in space.

Figure 2:
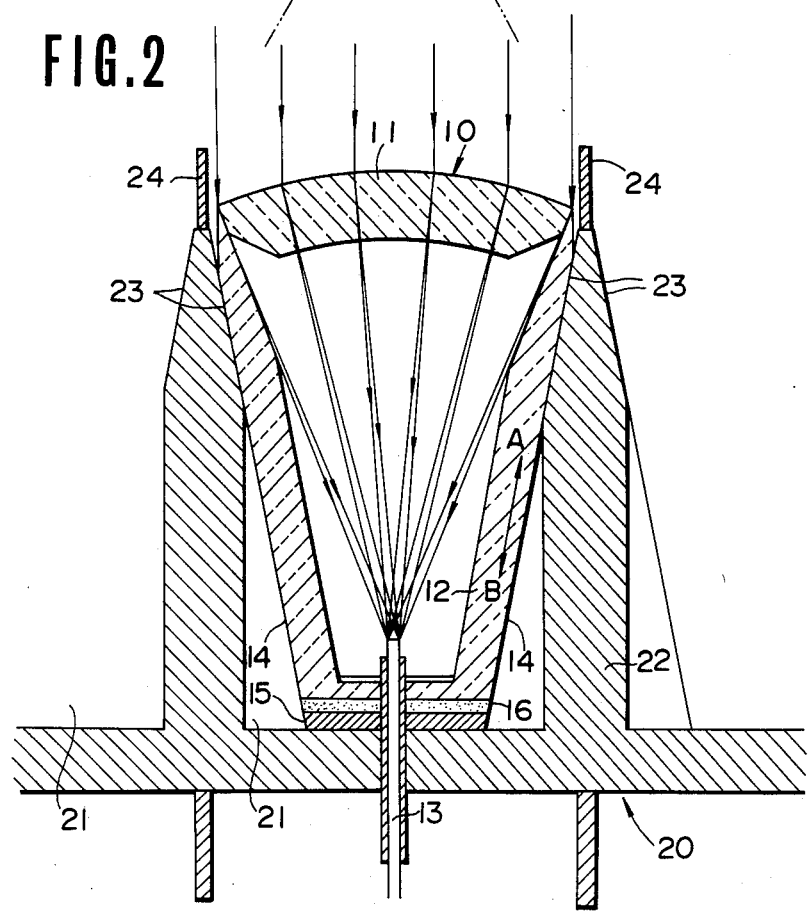
FIG. 2 is a cross-section view of FIG. 1.
Figure 3:
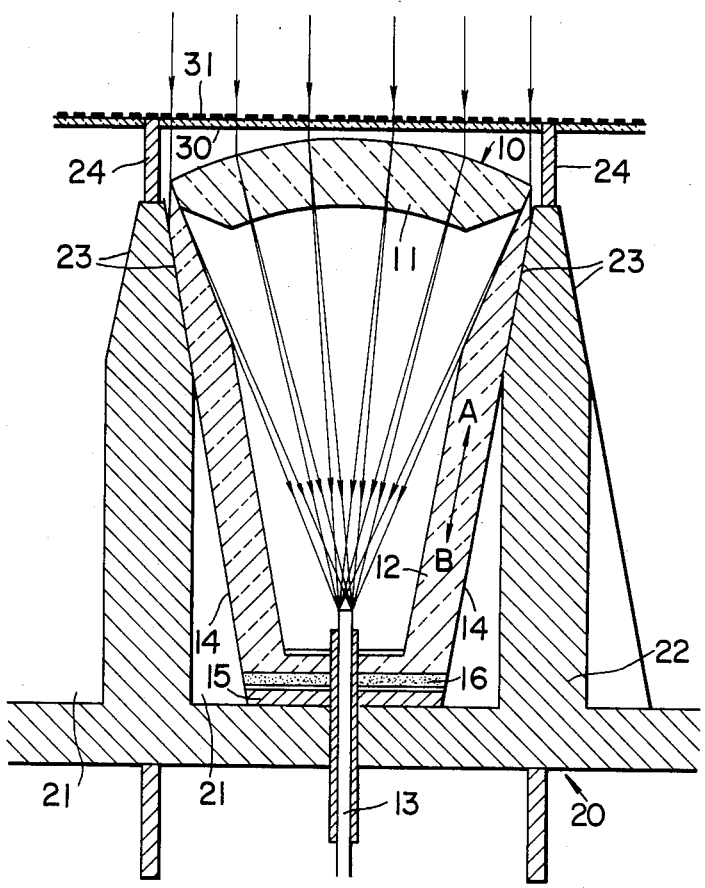
FIG. 3 is a cross-sectional view of the main body for explaining an embodiment of the solar ray collecting device according to the present invention.
Figure 4:
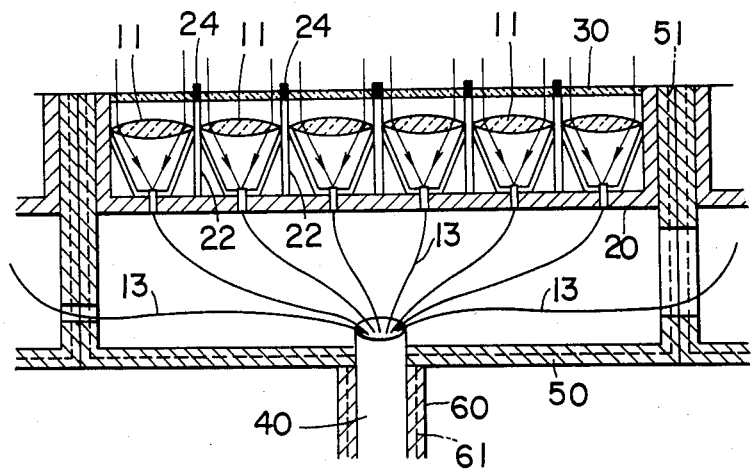
FIG. 4 is an outlined, cross-sectional view showing the construction of one unit of the solar ray collecting device according to the present invention.
Figure 5:
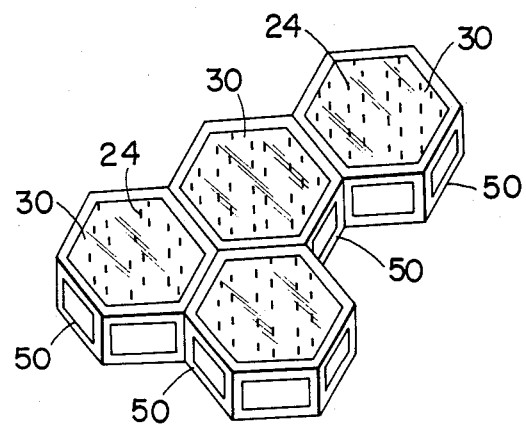
FIG. 5 is a partial view of a combination of lenses constructed by combining several units of the solar ray collecting device according to the present invention.

FIG. 3 is a partially enlarged cross-sectional view for explaining the construction of an embodiment of the solar ray collecting device according to the present invention. FIG. 4 is a side cross-sectional view showing one unit of the solar ray collecting device according to the present invention. FIG. 5 is a partially outlined, perspective view of a combination of lenses constructed by combining several units of the solar ray collecting device according to the present invention. In FIG. 3, the same reference numeral as in FIG. 2 is attached to the part performing the same function as in FIG. 2.

In the present invention a transparent optically-stable protection cover 30, for instance, a cover 30, made of quartz glass and having the characteristics of being flat, and of not being susceptible to heat distortion, is installed at the light-receiving side of the lens 11. The protective cover 30 is mixed with a filter material capable of preventing X-rays, γ-rays and ultraviolet rays from passing through and of letting only visible rays pass through. Such a construction prevents many X-rays, γ-rays and ultraviolet rays which exist in space from passing through the optical fiber. Therefore, only pure visible rays are transmitted into the optical fiber 13.

In such a manner, the rays guided into the respective optical fibers 13 are collectively guided into the optical conductor cable 40 and further guided into the spacecraft through the optical conductor cable 40.

The present applicant has already proposed a lens coated with an evaporated metal layer 31 for the purpose of obtaining such a filtering effect as already mentioned above. (Refer to the Japanese Patent Application, No. JAP 58-22573.) Ultraviolet rays or infrared rays can be prevented from passing through the optical system by coating the lens with an evaporated metal layer.

However, when X-rays and ultraviolet rays are prevented from passing through the optical system in such a manner, heat is generated therein as a matter of course. Consequently, the protective cover and the optical system expand thermally so that they are apt to be destroyed by the heat generated. Furthermore, in space, the temperature difference between the side hit by solar rays and the opposite side is very great and therefore the optical system and other portions thereof may be apt to be destroyed because of the temperature differences.

The present invention was created in order to solve such problems. The protection bar 24 and the supporting member 20 are placed with the heat-conductive members, and the tip end portion of the protection bar 24 is connected with the protective cover 30 which has a high heat-conductive efficiency. The heat energy received by the protective cover 30 is transmitted to the rear side of the supporting base plate 20 through the protection bar 24 and the side wall 22 of the supporting member 20, etc.

In such a manner, the heat energy received by the protective cover 30 is transmitted at once to the rear side of the supporting base plate 20 so that the protective cover and the lens, at the light-receiving side are not distorted by the heat generated. In space, the temperature difference between the place hit by the solar rays and the place not hit by them is very great and the property of matter changes in accordance with the temperature differences resulting in the destruction of the components on some occasions. The optical conductor cables are distributed in order to connect them over a comparatively long distance. Consequently, places hit by solar rays and other places not hit by them exist inbetween. The former becomes hot while the latter becomes cold. At such a place as mentioned above, the optical conductor cable is apt to be destroyed because of the temperature differences.

In FIG. 4, 50 is a protective member for covering the side portion and the rear portion of the solar ray collecting unit as mentioned before and 60 is a protective member for covering the optical conductor cable 40. Heat-conductive members 51 and 61, for instance, members like heat pipes, are buried in those protective members. By use of those heat pipes, heat is transmitted at once to the cold place so as to make the temperatures uniform. Extreme temperature differences can thus be prevented.

The embodiment employing the hexagonal pyramid is described heretofore. However, the present invention is not limited only to the embodiment. For instance, the side surface of the supporting member's recessed portion doesn't always have to be in the shape of a hexagonal pyramid. Instead, it may be in the shape of a circular cone.

As is apparent from the foregoing description, according to the present invention it is possible to provide a solar ray collecting device in which the optical system is not destroyed because of thermal expansion and temperature differences and furthermore only pure visible rays can be collected without receiving any harmful rays like ultraviolet rays and X-rays, in space.

What is claimed is:

1. A solar ray collecting device for use in space comprising a heat-conducting support base plate provided with a plurality of adjacent hexagonal recess portions, optical system means installed on each of said recess portions, each of said recess portions having a side wall with an upper surface, heat-conductive protective bars disposed on said upper surfaces of said side walls, and a protective cover and filter means disposed on said upper surfaces of said side walls, said protective cover and filter means permitting visible rays to pass therethrough such that visible rays are thereby transmitted through said protective cover and filter means to the optical system means, said protective cover and filter means being in heat-conductive contact with said upper surfaces of said side walls such that heat received by said protective cover and filter means is transmitted to said side walls and said heat-conducting support base plate.

2. A solar ray collecting device as defined in claim 1, wherein said optical system means comprises a light collecting lens having the same configuration as said hexagonal recess portion, a heat-conductive hexagonal pyramid member disposed in said recess portion, said light collecting lens being disposed on the upper side of said pyramid member, and optical fiber means having a light receiving edge which is positioned at the focal point of said light collecting lens, said side walls having an upper internal circumferential surface formed as an inclined surface which is slidably engaged with an external surface of said hexagonal pyramid member.

3. A solar ray collecting device as claimed in claim 2, wherein said upper internal circumferential surface defines a first inclined surface, said pyramid member having an outer surface, the upper end portion of said second outer surface defining a second inclined surface, said first and second inclined surfaces being slidably engaged.

4. A solar ray collecting device as claimed in claim 1, wherein said protective cover and filter means prevent X-rays, γ-rays, and utlraviolet rays from passing therethrough such that only pure visible rays are transmitted therethrough.

5. A solar ray collecting device as claimed in claim 1, wherein said side walls have an upper end portion which is progressively thinner as the upper surface of said side wall is approached.

6. A solar ray collecting device as claimed in claim 1 further comprising a protective member disposed about the sides and the bottom of the collecting device, and heat conductive members disposed and buried in said protective member.

7. A solar ray collecting device as claimed in claim 1, wherein said optical system means further comprises a light collecting lens and an optical conductor such that said visible rays are guided into said optical conductor from said light collecting lens, and a heat-conductive protective coating disposed about said optical conductor.

* * * * *